United States Patent [19]

Zappia et al.

[11] Patent Number: 4,822,833

[45] Date of Patent: Apr. 18, 1989

[54] STABILIZED RIGID POLYVINYL CHLORIDE COMPOSITIONS

[75] Inventors: Jean M. Zappia, Yonkers, N.Y.; Gerald A. Capocci, Greenwich, Conn.

[73] Assignee: Ciba-Geigy Corporation, Ardsley, N.Y.

[21] Appl. No.: 153,529

[22] Filed: Feb. 3, 1988

Related U.S. Application Data

[63] Continuation of Ser. No. 80,143, Jul. 29, 1987, abandoned, which is a continuation of Ser. No. 837,984, Mar. 10, 1986, abandoned.

[51] Int. Cl.$^4$ ............... C08K 5/34; C08K 3/22; C08K 5/09; C08K 5/58

[52] U.S. Cl. .................. 524/99; 524/83; 524/95; 524/100; 524/101; 524/102; 524/103; 524/175; 524/178; 524/181; 524/399; 524/497; 524/513; 524/567

[58] Field of Search ............... 524/99, 102, 178, 181, 524/399, 497, 568, 83, 95, 100, 101, 103, 175, 513, 567

[56] References Cited

U.S. PATENT DOCUMENTS

| | | | |
|---|---|---|---|
| 2,870,182 | 1/1959 | Leistner et al. | 524/180 |
| 3,398,114 | 8/1968 | Pollock | 524/180 |
| 3,442,806 | 5/1969 | O'Neill | 524/180 |
| 3,547,874 | 12/1970 | Murayama et al. | 524/102 |
| 3,562,305 | 2/1971 | Hoch | 524/181 |
| 3,640,928 | 2/1972 | Murayama et al. | 524/102 |
| 3,657,294 | 4/1972 | Gloskey | 524/180 |
| 3,840,494 | 10/1974 | Murayama et al. | 524/102 |
| 3,933,741 | 1/1976 | Larkin et al. | 524/181 |
| 4,021,432 | 5/1977 | Holt et al. | 524/102 |
| 4,049,647 | 9/1977 | Holt et al. | 524/102 |
| 4,064,102 | 12/1977 | Hillard et al. | 524/102 |
| 4,120,845 | 10/1978 | Kugele | 524/181 |
| 4,265,803 | 5/1981 | Soma et al. | 524/102 |

FOREIGN PATENT DOCUMENTS

58-142928 8/1983 Japan.
59-196351 11/1984 Japan.

*Primary Examiner*—Kriellion Morgan
*Attorney, Agent, or Firm*—Harry Falber

[57] ABSTRACT

Rigid polyvinyl chloride stabilized against the adverse effects of ultraviolet radiation by the addition thereto of effective amounts of 2,2,6,6-tetraalkylpiperidine compound and an organotin carboxylate thermal stabilizer, optionally with reduced amounts of titanium dioxide, organotin mercapto esters and/or organotin mercaptide thermal stabilizers.

16 Claims, No Drawings

STABILIZED RIGID POLYVINYL CHLORIDE COMPOSITIONS

This application is a continuation of application Ser. No. 080,143, filed July 29, 1987, now abandoned, which is a continuation of Ser. No. 837,984, filed Mar. 10, 1986, now abandoned.

Rigid polyvinyl chloride is utilized for a variety of applications including, for example, siding for houses and window frames. The rigid polyvinyl chloride is generally formulated with high levels of titanium dioxide, e.g. 12–15 parts per hundred, in order to provide proper pigmentation and prevent significant color variation upon exposure to UV radiation and with a tin mercaptide compound as a heat and process stabilizer. The combination of the titanium dioxide and the tin mercaptide is included to permit the resin to be utilized outdoors, an essential characteristic, without undergoing excessive photodegradation. This is required by manufacturers who seek assurance that the siding, window frames, and the like, will be functional for substantial periods of time without significant color change, reduced physical properties or resin degradation.

There are, however, certain disadvantages to these systems. Thus, the tin mercaptides do not provide adequate protection against the UV light-induced degradation commonly encountered during long-term outdoor use. The use of blends of tin mercaptides and organotin carboxylates has been resorted to in an attempt to resolve this difficulty. While improvement has been noted with the latter blends, further protection during such long-term outdoor use is still required.

These are also certain disadvantages to the use of the indicated high levels of titanium dioxide. Of primary importance, the high content causes excessive wear and early failure, i.e. scoring and uneven wear of extruder barrels and screws in the polyvinyl chloride processing equipment, necessitating expensive and frequent replacement of parts. A further major shortcoming of rigid polyvinyl chloride containing these high titanium dioxide levels is that sidings prepared therefrom can only be in white or pastel colors. Darker shades of siding are not available because of the high levels. Attempts to lower the titanium dioxide level have resulted in significant reductions in light stability of the polyvinyl chloride as evidenced by unacceptable color changes, loss of impact strength and surface crazing.

It is, thus, the primary objective of this invention to provide rigid polyvinyl chloride which exhibits a broader range of performance characteristics than the prior art materials.

It is another object to provide rigid polyvinyl chloride with reduced titanium dioxide levels thereby substantially eliminating the disadvantages resulting from the use of high levels.

It is a further object to provide such material without sacrificing the beneficial properties thereof, such as effective light stability and high impact strength.

Various other objectives of this invention will become apparent from a reading of the following description thereof.

It has now been determined that rigid polyvinyl chloride products can be prepared with excellent resistance to thermal degradation during processing and improved long term resistance to UV degradation. In addition, levels of titanium dioxide can be significantly reduced or eliminated totally without significant impact on performance, thereby reducing the wear on and resulting failure of processing equiment while giving siding and frame manufacturers greater flexibility in the color of the manufactured item, i.e. availability of darker colors. Thus, by incorporating a 2,2,6,6-tetraalkylpiperidine compound and an organotin carboxylate thermal stabilizer, optionally with a tin mercapto ester and/or mecaptide thermal stabilizer and/or up to about ten parts per hundred of titanium dioxide, into rigid polyvinyl chloride, the resulting formulated products will exhibit the performance characteristics noted hereinabove.

The 2,2,6,6-tetraalkyl piperidine compounds to be used according to the invention are generally known and are recognized for their ability to combat light degradation in a variety of substrates including polyvinyl chloride. U.S. Pat. Nos. 3,542,729, 3,547,874, 3,640,928, 3,840,494, 4,021,432, 4,049,647, 4,064,102, 4,086,204 and 4,265,805 are typical of the numerous patents that disclose such piperidine light stabilizers.

The hindered amine light stabilizers useful in the instant invention are in particular 2,2,6,6-tetraalkyl-piperidine compounds which contain a group of the formula (I)

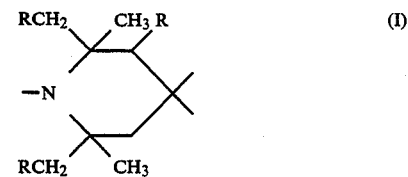

in which R is hydrogen or methyl.

The light stabilizers to be used according to the invention include in particular the following classes of compounds:

(a) Light stabilizers of the formula (II)

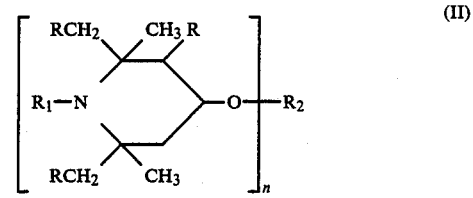

in which n is a number from 1–4 inclusive, preferably 1 or 2; R is as defined under the formula (I); $R_1$ is hydrogen, oxyl, $C_1$–$C_{18}$ alkyl, $C_3$–$C_8$ alkenyl, $C_3$–$C_8$ alkynyl, $C_7$–$C_{12}$ aralkyl, $C_1$–$C_8$ alkanoyl, $C_3$–$C_5$ alkenoyl, glycidyl, a group —$CH_2CH(OH)$—$Z_1$ wherein $Z_1$ is hydrogen, methyl or phenyl, with $R_1$ preferably being hydrogen, $C_1$–$C_{12}$ alkyl, allyl, benzyl, acetyl or acryloyl; and $R_2$ when n is 1 is hydrogen, $C_1$–$C_{18}$ alkyl optionally interrupted by one or more oxygen atoms, cyanoethyl, benzyl, glycidyl, a monovalent radical of an aliphatic, cycloaliphatic, araliphatic or aromatic carboxylic acid, or of carbamic acid or of a phosphorus-containing acid, or a monovalent silyl radical, preferably a radical of an aliphatic carboxylic acid having 2–18 C atoms, of a cycloaliphatic carboxylic acid having 5–12 C atoms or of an aromatic carboxylic acid having 7–15 C atoms; $R_2$ when n is 2 is $C_1$–$C_{12}$ alkylene, $C_4$–$C_{12}$ alkenylene, xylylene, a bivalent radical of an aliphatic, cycloaliphatic, araliphatic or aromatic dicarboxylic acid, of dicarbamic acid or of a phosphorus-containing acid, or a bivalent silyl radical, preferably a radical of an aliphatic dicarboxylic acid having 2–36 C atoms, of a cycloaliphatic or aromatic dicarboxylic acid having 8–14 C atoms, or of an aliphatic, cycloaliphatic or aromatic dicarbamic acid having 8–14 C atoms; $R_2$ when n is 3 is a trivalent radical of an aliphatic, cycloaliphatic or aromatic tricarboxylic acid, of an aromatic tricarbamic acid or of a phosphorus-containing acid, or a trivalent silyl radical; and $R_2$ when n is 4 is a tetravalent radical of an aliphatic, cycloaliphatic or aromatic tetracarboxylic acid.

If any substituents are $C_1-C_{12}$ alkyl, they are for example methyl, ethyl, n-propyl, n-butyl, sec-butyl, tert-butyl, n-hexyl, n-octyl, 2-ethyl-hexyl, n-nonyl, n-decyl, n-undecyl or n-dodecyl.

As $C_1-C_{18}$ alkyl, $R_1$ or $R_2$ can be for example the groups given above, and in addition for example n-tridecyl, n-tetradecyl, n-hexadecyl or n-octadecyl.

When $R_1$ is $C_3-C_8$ alkenyl, it can be for example 1-propenyl, allyl, methallyl, 2-butenyl, 2-pentenyl, 2-hexenyl, 2-octenyl or 4-tert-butyl-2-butenyl.

As $C_3-C_8$ alkynyl, $R_1$ is preferably propargyl.

$R_1$ as $C_7-C_{12}$ aralkyl is in particular phenethyl or especially benzyl.

As $C_1-C_8$ alkanoyl, $R_1$ is for example formyl, propionyl, butyryl, octanoyl but preferably acetyl, and as $C_3-C_5$ alkenoyl, $R_1$ is particularly acryloyl.

If $R_2$ is a monovalent radical of a carboxylic acid, it is for example a radical of acetic acid, stearic acid, salicylic acid, methacrylic acid, maleic acid, benzoic acid or β-(3,5-di-tert-butyl-4-hydroxyphenyl)-propionic acid.

If $R_2$ is a bivalent radical of a dicarboxylic acid, it is for example a radical of adipic acid, suberic acid, sebacic acid, phthalic acid, dibutylmalonic acid, dibenzylmalonic acid or butyl-(3,5-di-tert-butyl-4-hydroxybenzyl)malonic acid, or bicycloheptenedicarboxylic acid.

If $R_2$ is a trivalent radical of a tricarboxylic acid, it is for example a radical of trimellitic acid or of nitrilotriacetic acid.

If $R_2$ is a tetravalent radical of a tetracarboxylic acid, it is for example a radical of pyromellitic acid.

If $R_2$ is a bivalent radical of a dicarbamic acid, it is for example a radical of hexamethylenedicarbamic acid or of 2,4-toluylenedicarbamic acid.

The following compounds are examples of polyalkylpiperidine light stabilisers of this class:
(1) 4-hydroxy-2,2,6,6-tetramethylpiperidine,
(2) 1-allyl-4-hydroxy-2,2,6,6-tetramethylpiperidine,
(3) 1-benzyl-4-hydroxy-2,2,6,6-tetramethylpiperidine,
(4) 1-(4-tert-butyl-2-butenyl)-4-hydroxy-2,2,6,6-tetramethylpiperidine,
(5) 4-stearoyloxy-2,2,6,6-tetramethylpiperidine,
(6) 1-ethyl-4-salicyloyloxy-2,2,6,6-tetramethylpiperidine,
(7) 4-methacryloyloxy-1,2,2,6,6-pentamethylpiperidine,
(8) 1,2,2,6,6-pentamethylpiperidin-4-yl-β-(3,5-di-tert-butyl-4-hydroxyphenyl)-propionate,
(9) 1-benzyl-2,2,6,6-tetramethyl-4-piperidinylmaleinate,
(10) (di-2,2,6,6-tetramethylpiperidin-4-yl)-adipate
(11) (di-2,2,6,6-tetramethylpiperidin-4-yl)-sebacate,
(12) (di-1,2,3,6-tetramethyl-2,6-diethyl-piperidin-4-yl)-sebacate,
(13) (di-1-allyl-2,2,6,6-tetramethyl-piperidin-4-yl)-phthalate,
(14) 1-propargyl-4-β-cyanoethyloxy-2,2,6,6-tetramethylpiperidine,
(15) 1-acetyl-2,2,6,6-tetramethylpiperidin-4-yl-acetate,
(16) trimellitic acid-tri-(2,2,6,6-tetramethylpiperidin-4-yl) ester,
(17) 1-acryloyl-4-benzyloxy-2,2,6,6-tetramethylpiperidine,
(18) dibutyl-malonic acid-di-(1,2,2,6,6-pentamethyl-piperidin-4-yl) ester,
(19) butyl-(3,5-di-tert-butyl-4-hydroxybenzyl)-malonic acid-di-(1,2,2,6,6-pentamethylpiperidin-4-yl) ester,
(20) dibenzyl-malonic acid-di-(1,2,2,6,6-pentamethyl-piperidin-4-yl) ester,
(21) dibenzyl-malonic acid-di-(1,2,3,6-tetramethyl-2,6-diethyl-piperidin-4-yl) ester,
(22) hexane-1',6'-bis-(4-carbamoyloxy-1-n-butyl-2,2,6,6-tetramethylpiperidine),
(23) toluene-2',4'-bis-(4-carbamoyloxy-1-n-propyl-2,2,6,6-tetramethylpiperidine),
(24) dimethyl-bis-(2,2,6,6-tetramethylpiperidine-4-oxy)-silane,
(25) phenyl-tris-(2,2,6,6-tetramethylpiperidine-4-oxy)-silane,
(26) tris-(1-propyl-2,2,6,6-tetramethylpiperidin-4-yl)-phosphite,
(27) tris-(1-propyl-2,2,6,6-tetramethylpiperidin-4-yl)-phosphate, and
(28) phenyl-[bis-(1,2,2,6,6-pentamethylpiperidin-4-yl)]-phosphonate.

(b) Light stabilizers of the formula (III)

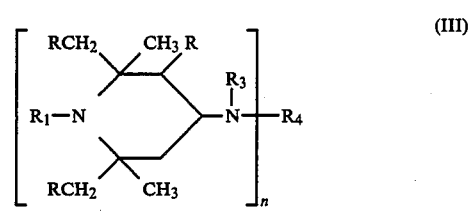

(III)

in which n is the number 1 or 2; R is as defined under the formula I; $R_1$ is as defined under (a); $R_3$ is hydrogen, $C_1-C_{12}$ alkyl, $C_5-C_7$ cycloalkyl, $C_7-C_8$ aralkyl, $C_2-C_{18}$ alkanoyl, $C_3-C_5$ alkenoyl or benzoyl; and $R_4$ when n is 1 is hydrogen, $C_1-C_{18}$ alkyl, $C_5-C_7$ cycloalkyl, $C_2-C_8$ alkenyl unsubstituted or substituted by a cyano, carbonyl or carbamide group, or it is glycidyl, a group of the formula $—CH_2—CH(OH)—Z_1$ or of the formula $—CONH—Z_1$ wherein Z is hydrogen, methyl or phenyl; or $R_4$ when n is 2 is $C_2-C_{12}$ alkylene, $C_6-C_{12}$ arylene, xylilene, a $—CH_2—CH(OH)—CH_2$ group, or a group $—CH_2—CH(OH)—CH_2—O—X—O—CH_2—CH(OH)—CH_2—$ wherein X is $C_2-C_{10}$ alkylene, $C_6-C_{15}$ arylene or $C_6-C_{12}$ cycloalkylene; or, provided that $R_3$ is not alkanoyl, alkenoyl or benzoyl, $R_4$ can also be a bivalent radical of an aliphatic, cycloaliphatic or aromatic dicarboxylic acid or dicarbamic acid, or can be the group $—CO—$; or $R_3$ and $R_4$ together when n is 1 can be the cyclic radical of an aliphatic or aromatic 1,2- or 1,3-dicarboxylic acid.

If any substituents are $C_1-C_{18}$ alkyl, they are as already defined under (a).

If any substituents are $C_5-C_7$ cycloalkyl, they are in particular cyclohexane.

As $C_7-C_8$ aralkyl, $R_3$ is particularly phenethyl or above all benzyl.

As $C_2-C_{18}$ alkanoyl, $R_3$ is for example propionyl, butyryl, octanoyl, dodecanoyl, hexadecanoyl, octadecanoyl but preferably acetyl; and as $C_3-C_5$ alkenoyl, $R_3$ is in particular acryloyl.

If $R_4$ is $C_2$–$C_8$ alkenyl unsubstituted or substituted by a cyano, carbonyl or carbamide group, it is for example 1-propenyl, allyl, methallyl, 2-butenyl, 2-pentenyl, 2-hexenyl, 2-octenyl, 2,2-dicyanovinyl, 1-methyl-2-cyano-2-methoxycarbonyl-vinyl or 2,2-diacetylaminovinyl.

If any substituents are $C_2$–$C_{12}$ alkylene, they are for example ethylene, propylene, 2,2-dimethylpropylene, tetramethylene, hexamethylene, octamethylene, decamethylene or dodecamethylene.

If any substituents are $C_6$–$C_{15}$ arylene, they are for example o-, m- or p-phenylene, 1,4-naphthylene or 4,4'-diphenylene.

As $C_6$–$C_{12}$ cycloalkylene, X is especially cyclohexylene.

The following compounds are examples of polyalkylpiperidine light stabilisers of this class:
(29) N,N'-bis-(2,2,6,6-tetramethylpiperidin-4-yl)-hexamethylene-1,6-diamine,
(30) N,N'-bis-(2,2,6,6-tetramethylpiperidin-4-yl)-hexamethylene-1,6-diacetamide,
(31) 1-acetyl-4-(N-cyclohexylacetamido)-2,2,6,6-tetramethylpiperidine,
(32) 4-benzylamino-2,2,6,6-tetramethylpiperidine,
(33) N,N'-bis-(2,2,6,6-tetramethylpiperidin-4-yl)-N,N'-dibutyl-adipamide,
(34) N,N'-bis-(2,2,6,6-tetramethylpiperidin-4-yl)-N,N'-dicyclohexyl-(2-hydroxypropylene),
(35) N,N'-bis-(2,2,6,6-tetramethylpiperidin-4-yl)-p-xylylene-diamine,
(36) the compound of the formula

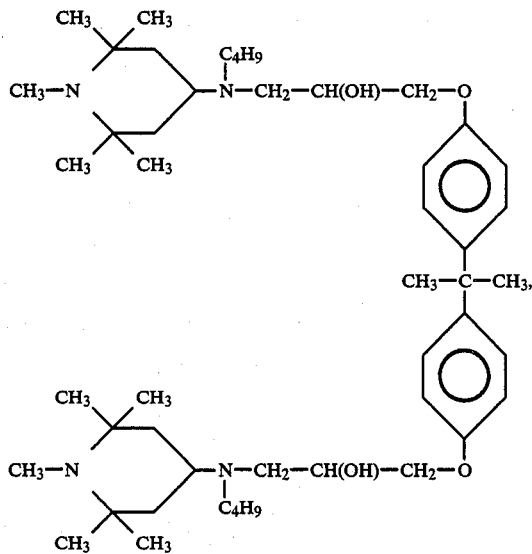

(37) 4-(bis-2-hydroxyethyl)-amino-1,2,2,6,6-pentamethylpiperidine,
(38) 4-(3-methyl-4-hydroxy-5-tert-butyl-benzoic acid-amido)-2,2,6,6,-tetramethylpiperidine,
(39) 4-methacrylamido-1,2,2,6,6-pentamethylpiperidine, and
(40) α-cyano-β-methyl-β-[N-(2,2,6,6-tetramethylpiperidin-4-yl)]-amino-acrylic acid methyl ester.

(c) Light stabilisers of the formula (IV)

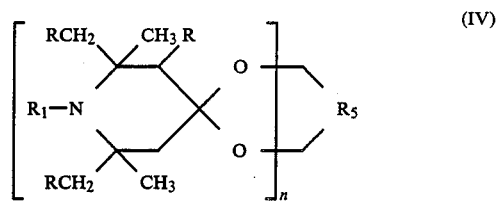

in which n is the number 1 or 2; R is as defined under the formula (I); $R_1$ is as defined under (a); and $R_5$ when n is 1 is $C_2$–$C_8$ alkylene or hydroxyalkylene or $C_4$–$C_{22}$ acyloxyalkylene; and $R_5$ when n is 2 is the group $(-CH_2)_2C(CH_2-)_2$.

If $R_5$ is $C_2$–$C_8$ alkylene or hydroxyalkylene, it is for example ethylene, 1-methyl-ethylene, propylene, 2-ethylpropylene or 2-ethyl-2-hydroxymethylpropylene.

As $C_4$–$C_{22}$ acyloxyalkylene, $R_5$ is for example 2-ethyl-2-acetoxymethyl-propylene.

The following compounds are examples of polyalkylpiperidine light stabilisers of this class:
(41) 9-aza-8,8,10,10-tetramethyl-1,5-dioxaspiro-[5.5]undecane,
(42) 9-aza-8,8,10,10-tetramethyl-3-ethyl-1,5-dioxaspiro[5.5]decane,
(43) 8-aza-2,7,7,8,9,9-hexamethyl-1,4-dioxyspiro[4.5]decane,
(44) 9-aza-3-hydroxymethyl-3-ethyl-8,8,9,10,10-pentamethyl-1,5-dioxaspiro[5.5]undecane,
(45) 9-aza-3-ethyl-3-acetoxymethyl-9-acetyl-8,8,10,10-tetramethyl-1,5-dioxaspiro[5.5]undecane, and
(46) 2,2,6,6-tetramethylpiperidine-4-spiro-2'-(1',3'-dioxane)-5'-spiro-5''-(1'',3''-dioxane)-2''-spiro-4'''-(2''',2''',6''',6'''-tetramethylpiperidine).

(d) Light stabilizers of the formulae (VA), (VB) and (VC)

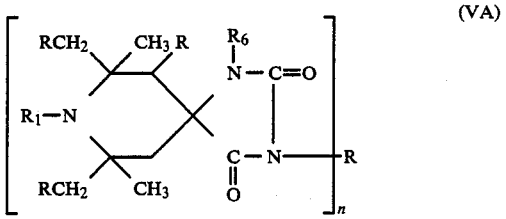

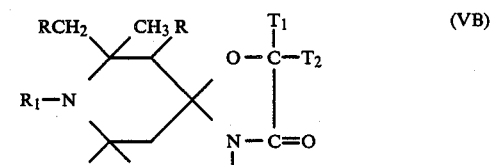

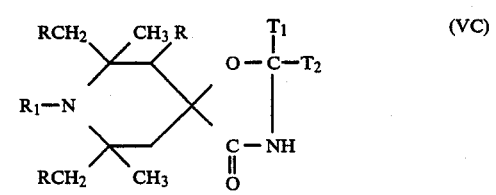

in which n is the number 1 or 2, R is as defined under formula (I), $R_1$ is as defined under (a), $R_6$ is hydrogen, $C_1$–$C_{12}$alkyl, allyl, benzyl, glycidyl or $C_2$–$C_6$alkoxyalkyl and $R_7$, if n=1, is hydrogen, $C_1$–$C_{12}$alkyl, $C_3$–$C_5$alkenyl, $C_7$–$C_9$ aralkyl, $C_5$–$C_7$ cycloalkyl, $C_2$–$C_4$ hydroxyalkyl, $C_2$-$C_6$ alkoxyalkyl, $C_6$-$C_{10}$aryl, glycidyl or a group of the formula —$(CH_2)_m$—COO—Q or of the formula —$(CH_2)_m$—O—CO—Q, in which m is 1 or 2 and Q is $C_1$-$C_{18}$alkyl or phenyl, and if n=2 is $C_2$-$C_{12}$ alkylene, $C_6$-$C_{12}$ arylene, $C_4$-$C_{12}$ arylene, $C_4$-$C_{12}$ alkenylene, a group —$CH_2$—CH(OH)—$CH_2$—O—X—O—$CH_2$—CH(OH)—$CH_2$—, in which X is $C_2$-$C_{10}$ alkylene, $C_6$-$C_{15}$ arylene or $C_6$-$C_{12}$ cycloalkylene, or a group —$CH_2CH(OZ')CH_2$—$(OCH_2$—$CH(OZ')CH_2)_2$—, in which $Z'$ is hydrogen, $C_1$-$C_{18}$alkyl, allyl, benzyl, $C_2$-$C_{12}$ alkanoyl or benzoyl and $T_1$ and $T_2$ independently of one another are hydrogen, $C_1$-$C_{18}$ alkyl or $C_6$-$C_{10}$aryl which is unsubstituted or substituted by halogen or $C_1$-$C_4$alkyl, or $C_7$-$C_9$aralkyl, or $T_1$ and $T_2$ together with the C atom which bonds them form $C_5$-$C_7$cycloalkyl, pyrrolidinyl or piperidinyl, which are unsubstituted or substituted by $C_1$-$C_4$alkyl.

$C_1$-$C_{12}$ alkyl substituents are, for example, methyl, ethyl, n-propyl, n-butyl, sec.-butyl, tert.-butyl, n-hexyl, n-octyl, 2-ethyl, n-nonyl, n-decyl, n-undecyl or n-dodecyl.

$C_1$-$C_{18}$ alkyl substituents can be, for example, the groups listed above and, in addition, also for example, n-tridecyl, n-tetradecyl, n-hexadecyl or n-octadecyl.

$C_2$-$C_6$ alkoxyalkyl substituents are, for example, methoxymethyl, ethoxymethyl, propoxymethyl, tert.-butoxymethyl, ethoxyethyl, ethoxypropyl, n-butoxyethyl, tert.-butoxyethyl, isopropoxyethyl or propoxypropyl.

$C_3$-$C_5$ Alkenyl $R_7$ is, for example, 1-propenyl, allyl, methallyl, 2-butenyl or 2-pentenyl.

$C_7$-$C_9$ Aralkyl $R_7$, $T_1$ and $T_2$ is especially phenethyl or in particular benzyl, and $C_5$-$C_7$cycloalkyl $R_7$, $T_1$ and $T_2$ ($T_1$ and $T_2$ together with the C atom which bonds them) is in particular cyclohexyl.

$C_2$-$C_4$ Hydroxyalkyl $R_7$ is, for example, 2-hydroxyethyl, 2-hydroxypropyl, 2-hydroxybutyl or 4-hydroxybutyl.

$C_6$-$C_{10}$ Aryl $R_7$, $T_1$ and $T_2$ is especially phenyl or—or β-naphthyl, which are unsubstituted or substituted by halogen or $C_1$-$C_4$alkyl.

$C_2$-$C_{12}$ Alkylene $R_7$ is, for example, ethylene, propylene, 2,2-dimethylpropylene, tetramethylene, hexamethylene, octamethylene, decamethylene or dodecamethylene.

$C_4$-$C_{12}$ Alkenylene $R_7$ is especially 2-butenylene, 2-pentenylene or 3-hexenylene.

$C_6$-$C_{12}$ Arylene $R_7$ is, for example, o-, m- or p-phenylene, 1,4-naphthylene or 4,4'-diphenylene.

$C_2$-$C_{12}$ Alkanoyl $Z'$ is, for example, propionyl, butyryl, octanoyl or dodecanoyl but preperably acetyl.

$C_2$-$C_{10}$ Alkylene, $C_6$-$C_{15}$ arylene or $C_6$-$C_{12}$ cycloalkylene X is as defined under (b).

Examples of polyalkylpiperidine light stabilizers of this category are the following compounds:

(47) 3-Benzyl-1,3,8-triaza-7,7,9,9-tetramethylspiro[4.5]-decane-2,4-dione.

(48) 3-n-Octyl-1,3,8-triaza-7,7,9,9-tetramethylspiro[4.5]-decane-2,4-dione.

(49) 3-Allyl-1,3,8-triaza-1,7,7,9,9-pentamethylspiro[4.5]-decane-2,4-dione.

(50) 3-Glycidyl-1,3,8-triaza-7,7,8,9,9-pentamethylspiro-[4.5]decane-2,4-dione.

(50a) 2-iso-Propyl-7,7,9,9-tetramethyl-1-oxa-3,8-diaza-4-oxo-spiro[4.5]decane.

(50b) 2-Butyl-7,7,9,9-tetramethyl-1-oxa-3,8-diaza-4-oxospiro[4.5]decane.

(50c) 2-Isopropyl-7,7,9,9-tetramethyl-1-oxa-4,8-diaza-3-oxospiro[4.5]decane.

(50d) 2-Butyl-7,7,9,9-tetramethyl-1-oxa-4,8-diaza-3-oxospiro[4.5]decane or the compounds of the following formulae:

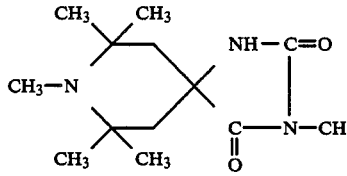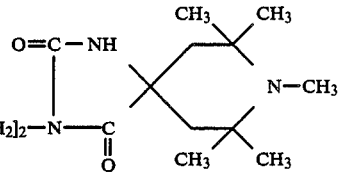 (51)

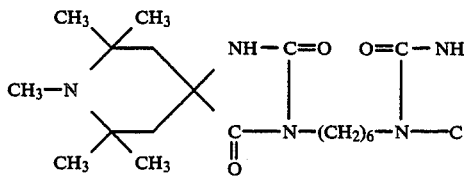 (52)

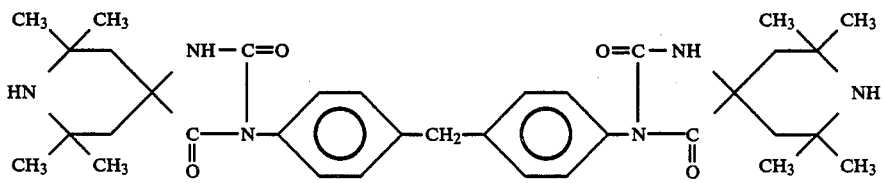 (53)

(e) Light stabilisers of the formula (VI)

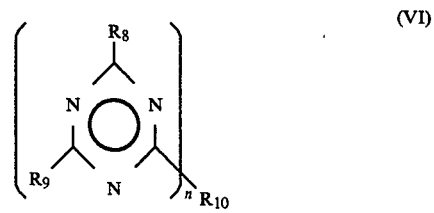 (VI)

in which n is the number 1 or 2, and $R_8$ is a group of the formula

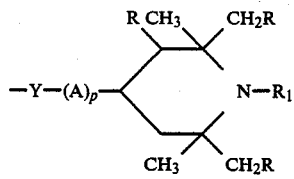

in which R is as defined under the formula (I), $R_1$ is as defined under (a), Y is —O— or —$NR_{11}$—, A is $C_2$-$C_6$ alkylene; and p is the number 0 or 1; $R_9$ is the groups $R_8$, $NR_{11}R_{12}$, —$OR_{13}$, —$NHCH_2OR_{13}$ or —$N(CH_2OR_{13})_2$; $R_{10}$ when n is 1 is the groups $R_8$ or $R_9$, and $R_{10}$ when n is 2 is the group —Y—D—Y— wherein D is $C_2$-$C_6$ alkylene optionally interrupted by —$N(R_{11})$—; $R_{11}$ is $C_1$-$C_{12}$ alkyl, cyclohexyl, benzyl or $C_1$-$C_4$ hydroxyalkyl, or a group of the formula

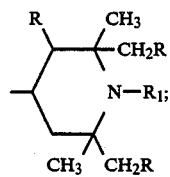

$R_{12}$ is $C_1$-$C_{12}$ alkyl, cyclohexyl, benzyl or $C_1$-$C_4$ hydroxyalkyl; $R_{13}$ is hydrogen, $C_1$-$C_{12}$ alkyl or phenyl; or $R_{11}$ and $R_{12}$ together are $C_4$-$C_5$ alkylene or oxaalkylene, or $R_{11}$ and $R_{12}$ are each a group of the formula

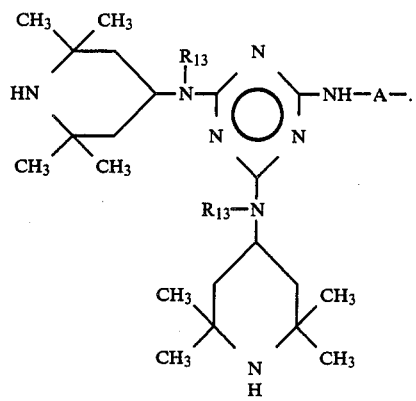

If any substituents are $C_1$-$C_{12}$ alkyl, they are for example methyl, ethyl, n-propyl, n-butyl, sec-butyl, tert-butyl, n-hexyl, n-octyl, 2-ethylhexyl, n-nonyl, n-decyl, n-undecyl or n-dodecyl.

If any substituents are $C_1$-$C_4$ hydroxyalkyl, they are for example 2-hydroxyethyl, 2-hydroxypropyl, 3-hydroxypropyl, 2-hydroxybutyl or 4-hydroxybutyl.

If A is $C_2$-$C_6$ alkylene, it is for example ethylene, propylene, 2,2-dimethylpropylene, tetramethylene or hexamethylene.

If $R_{11}$ and $R_{12}$ together are $C_4$-$C_5$ alkylene or oxaalkylene, this is for example tetramethylene, pentamethylene or 3-oxapentamethylene.

The compounds of the following formulae are examples of polyalkylpiperidine light stabilisers of this class:

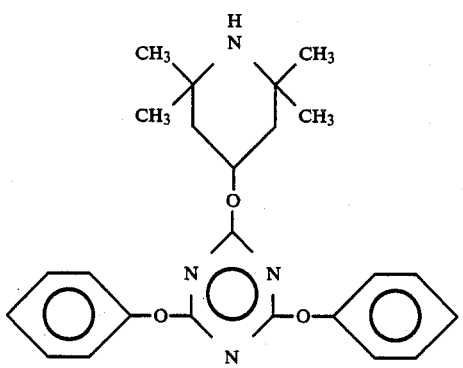

(54)

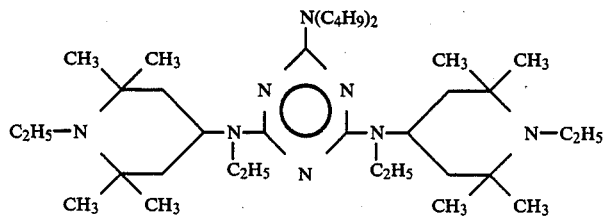

(55)

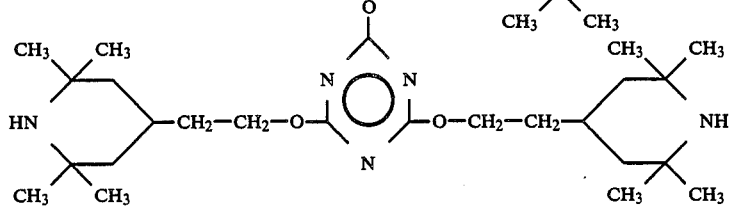 (56)
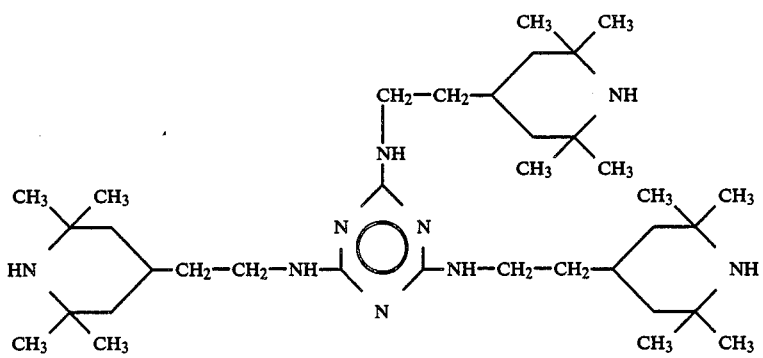 (57)
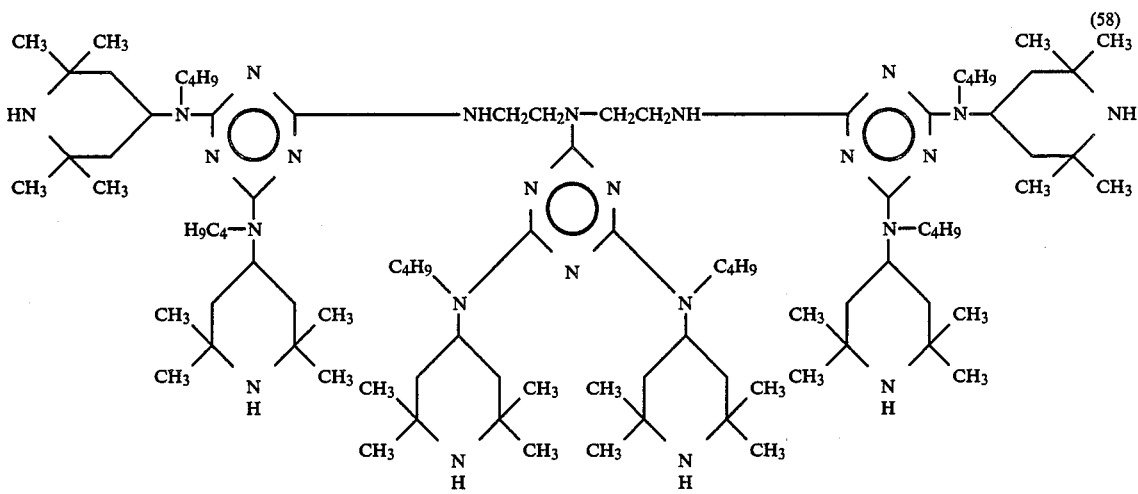 (58)
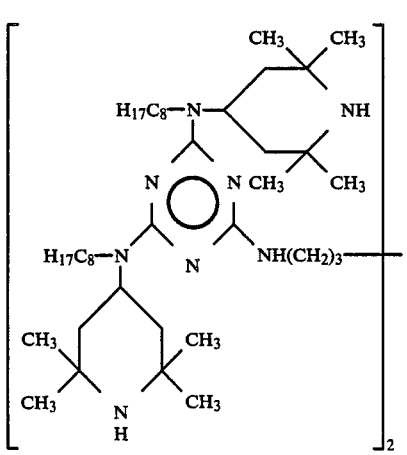 (59)
(f) Light stabilisers of the formula (VII)

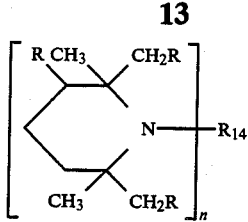

(VII)

in which n is the number 1 or 2; R is as defined under the formula (I); and $R_{14}$ when n is 1 is $C_4$-$C_{18}$ alkyl, $C_7$-$C_{12}$ aralkyl, the group —CO—$R_{15}$, or $C_1$-$C_4$ alkyl which is substituted by —CN, —COO$R_{16}$, —OH, —OCO$R_{17}$ or

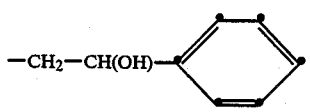

wherein $R_{15}$ is $C_1$-$C_{12}$ alkyl, $C_2$-$C_4$ alkenyl or phenyl, $R_{16}$ is $C_1$-$C_{18}$ alkyl, $R_{17}$ is $C_1$-$C_{18}$ alkyl, $C_2$-$C_{10}$ alkenyl, cyclohexyl, benzyl or $C_6$-$C_{10}$ aryl; or $R_{14}$ when n is 2 is $C_4$-$C_{12}$ alkylene, 2-butenylene-1,4, xylylene, the group —(CH$_2$)$_2$—OOC—$R_{18}$—COO—(CH$_2$)$_2$— or the group —CH$_2$—OOC—$R_{19}$—COO—CH$_2$— wherein $R_{18}$ is $C_2$-$C_{10}$ alkylene, phenylene or cyclohexylene, and $R_{19}$ is $C_2$-$C_{10}$ alkylene, xylylene or cyclohexylene.

If any substituents are $C_1$-$C_{12}$ alkyl, they are for example methyl, ethyl, n-propyl, n-butyl, sec-butyl, tert-butyl, n-hexyl, n-octyl, 2-ethyl-hexyl, n-nonyl, n-decyl, n-undecyl or n-dodecyl.

Any substituents which are $C_1$-$C_{18}$ alkyl can be for example the groups mentioned above, and in addition for example n-tridecyl, n-tetradecyl, n-hexadecyl or n-octadecyl.

If any groups are $C_2$-$C_{10}$ alkylene, these are in particular ethylene, propylene, 2,2-dimethylpropylene, tetramethylene, hexamethylene, octamethylene or decamethylene.

As $C_4$-$C_{18}$ alkyl, $R_{14}$ is for example n-butyl, sec-butyl, tert-butyl, n-hexyl, n-octyl, 2-ethyl-hexyl, 1,1-dimethyl-2-tert-butylethyl, n-nonyl, n-decyl, n-dodecyl, n-tridecyl, n-tetradecyl, n-hexadecyl or n-octadecyl.

If $R_{14}$ is a $C_1$-$C_4$ alkyl group substituted by —CN, it is for example cyanomethyl, cyanoethyl, 3-cyano-n-propyl or 4-cyano-n-butyl.

If $R_{14}$ is $C_4$-$C_{12}$ alkylene, it is for example 2,2-dimethylpropylene, tetramethylene, hexamethylene, octamethylene, decamethylene or dodecamethylene.

If $R_{14}$ is $C_7$-$C_{12}$ aralkyl, it is in particular phenethyl, p-methyl-benzyl or especially benzyl.

As $C_2$-$C_4$ alkenyl, $R_{15}$ is for example vinyl, 1-propenyl, allyl, methallyl or 2-butenyl.

As $C_2$-$C_{10}$ alkenyl, $R_{17}$ is for example the groups mentioned for $R_{15}$ as alkenyl, and in addition for example crotyl, 2-hexenyl, 2-octenyl or 2-decenyl.

If $R_{17}$ is $C_6$-$C_{10}$ aryl, it is for example phenyl which is unsubstituted or substituted in the o- or p-position by methyl, ethyl, isopropyl, n-butyl or tert-butyl.

The following compounds are examples of polyalkyl-piperidine light stabilisers of this class:

(60) bis-[β-(2,2,6,6-tetramethylpiperidino)-ethyl]-sebacate,

(61) α-(2,2,6,6-tetramethylpiperidino)-acetic acid-n-octyl ester, and

(62) 1,4-bis-(2,2,6,6-tetramethylpiperidino)-2-butene.

(g) Light stabilisers of the formula (VIII)

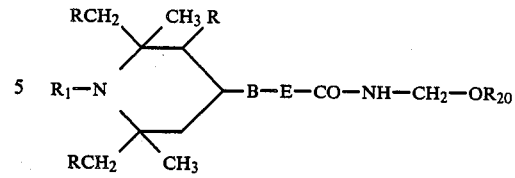

(VIII)

in which B is —N($R_{21}$)— or —O—; E is $C_1$-$C_3$ alkylene, the group —CH$_2$—CH($Z_{11}$)—O— wherein $Z_{11}$ is hydrogen, methyl or phenyl, the group —(CH$_2$)$_3$—NH— or a single bond; R is hydrogen or methyl; $R_1$ is hydrogen, $C_1$-$C_{18}$ alkyl, $C_3$-$C_8$ alkenyl, $C_3$-$C_8$ alkynyl, $C_7$-$C_{12}$ aralkyl, $C_1$-$C_8$ alkanoyl, $C_3$-$C_5$ alkenoyl or glycidyl; is hydrogen or $C_1$-$C_{18}$ alkyl; $R_{21}$ is hydrogen, $C_1$-$C_{18}$ alkyl, $C_5$-$C_7$ cycloalkyl, $C_7$-$C_{12}$ aralkyl, cyanoethyl, $C_6$-$C_{10}$ aryl, the group —CH$_2$—CH($Z_{11}$)—OH, a group of the formula

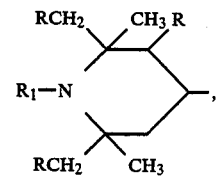

or a group of the formula

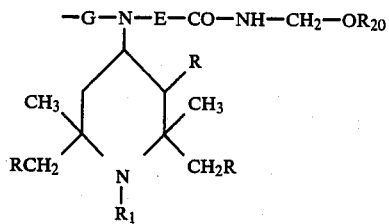

wherein G can be $C_2$-$C_6$ alkylene or $C_6$-$C_{12}$ arylene; or $R_{21}$ is a group —E—CO—NH—CH$_2$—OR$_{20}$ If any substituents are $C_1$-$C_{18}$ alkyl, they are for example methyl, ethyl, n-propyl, n-butyl, sec-butyl, tert-butyl, n-hexyl, n-octyl, 2-ethyl-hexyl, n-nonyl, -n-decyl, n-undecyl, n-dodecyl, n-tridecyl, n-tetradecyl, n-hexadecyl or n-octadecyl.

If any substituents are $C_7$-$C_{12}$ aralkyl, they are for example phenthyl or in particular benzyl.

If $R_1$ is $C_3$-$C_8$ alkenyl, it can be for example 1-propenyl, allyl, methallyl, 2-butenyl, 2-pentenyl, 2-hexenyl, 2-octenyl or 4-tert-butyl-2-butenyl.

As $C_3$-$C_8$ alkynyl, $R_1$ is preferably propargyl. As $C_1$-$C_8$ alkanoyl, $R_1$ is for example formyl, propionyl, butyryl, octanoyl but preferably acetyl; and as $C_3$-$C_5$ alkenoyl, $R_1$ is especially acryloyl.

As $C_5$-$C_7$ cycloalkyl, $R_3$ is in particular cyclohexyl.

As $C_6$-$C_{10}$ aryl, $R_3$ is particularly phenyl, or α- or β-naphthyl which is unsubstituted or substituted with halogen or $C_1$-$C_4$ alkyl. As $C_1$-$C_3$ alkylene, E is for example methylene, ethylene or propylene.

As $C_2$-$C_6$ alkylene, G is for example ethylene, propylene, 2,2-dimethylpropylene, tetramethylene or hexamethylene; and as $C_6$-$C_{12}$ arylene, G is o-, m- or p-phenylene, 1,4-naphthylene or 4,4'-diphenylene.

The following compounds are examples of polyalkyl-piperidine light stabilisers of this class:

(63) N-hydroxymethyl-N'-2,2,6,6-tetramethylpiperidin-4-yl-urea,
(64) N-methoxymethyl-N'-2,2,6,6-tetramethylpiperidin-4-yl-urea,
(65) N-methoxymethyl-N'-n-dodecyl-N'-2,2,6,6-tetramethylpiperidin-4-yl-urea, and
(66) O-(2,2,6,6-tetramethylpiperidin-4-yl)-N-methoxymethyl-urethane.

(h) Polymeric compounds of which the recurring structural unit contains a polyalkylpiperidine radical of the formula (I), especially polyesters, polyethers, polyamides, polyamines, polyurethanes, polyureas, polyaminotriazines, poly(meth)acrylates or poly(meth)acrylamides, and copolymers thereof which contain such radicals.

The compounds of the following formulae, wherein m is a number from 2 to about 200 inclusive, are examples of polyalkylpiperidine light stabilisers of this class.

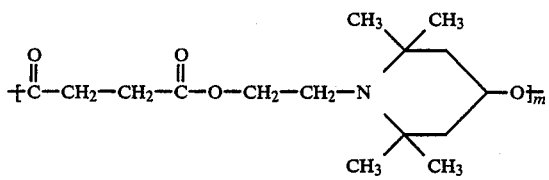

(67)

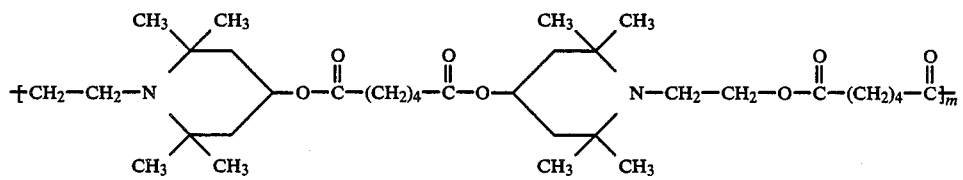

(68)

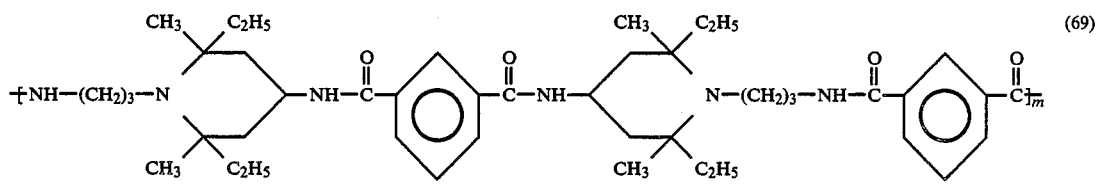

(69)

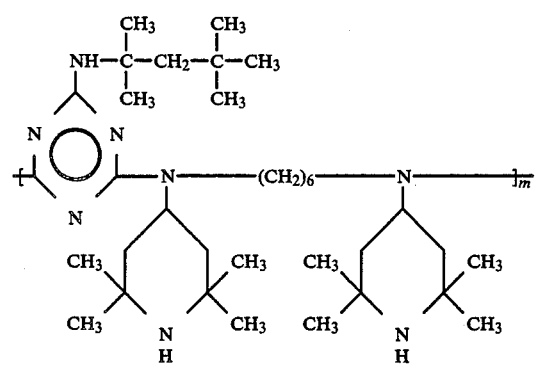

(70)

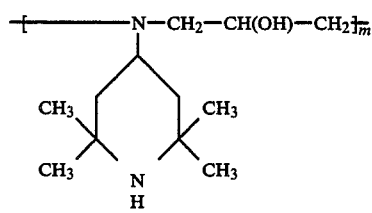

(71)

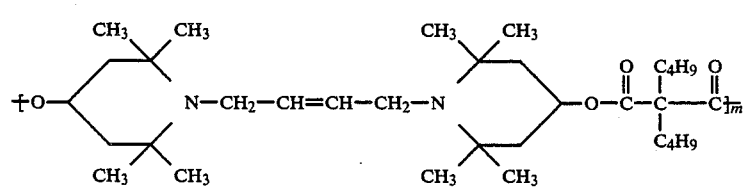

(72)

-continued

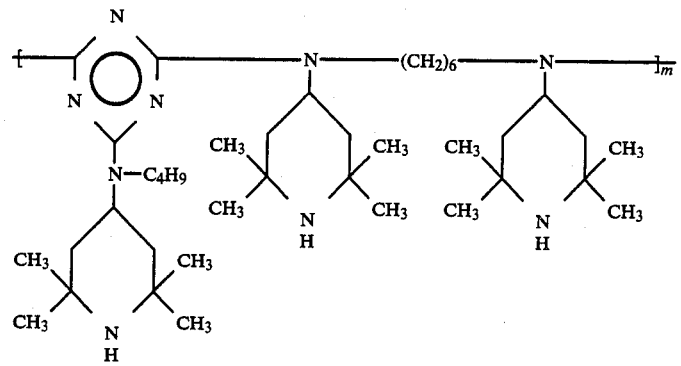
(73)

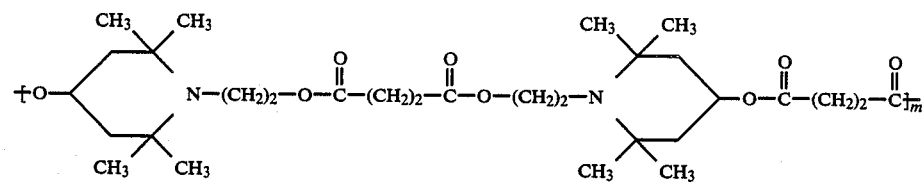
(74)

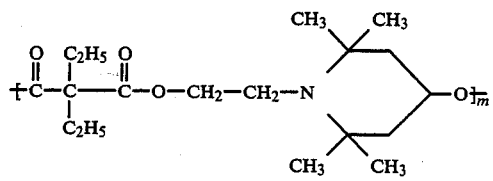
(75)

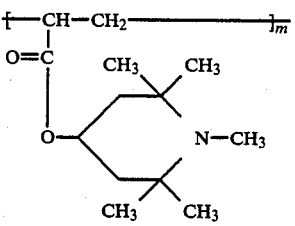
(76)

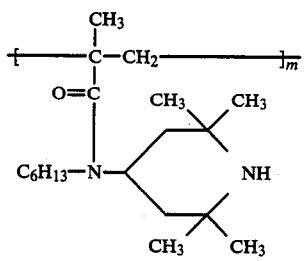
(77)

(i) Light stabilizers of the formula IX

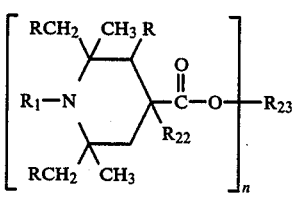
(IX)

wherein
n is an integer of 1 to 4, preferably 2,
$R_{22}$ is H, OH or $C_1$–$C_8$ alkoxy, and
if n is 1, $R_{23}$ is $C_1$–$C_{20}$ alkyl, $C_5$–$C_{12}$ cycloalkyl, $C_7$–$C_{14}$ aralkyl, and if n is 2, $R_{23}$ is $C_2$–$C_{12}$ alkylene, $C_6$–$C_{12}$ cycloalkylene, $C_8$–$C_{16}$ cycloalkylenene-dialkylene, $C_8$–$C_{14}$ aralkylene, $C_4$–$C_9$ mono- or dioxaalkylene, and
if n is 3, $R_{23}$ is $C_3$–$C_{12}$ alkane-triyl and
if n is 4, $R_{23}$ is $C_4$–$C_{12}$ alkane-tetrayl, and R and $R_1$ are as defined before.

(j) Light stabilizers of the formula (X)

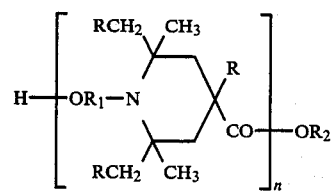
(X)

in which n is a number from 4–10 inclusive; and R, $R_1$ and $R_2$ are as previously defined.

The organotin carboxylates to be used according to the invention are generally known and are recognized for their ability to combat thermal degradation in polyvinyl chloride. For purposes of this invention, the organotin carboxylate component is identified as a compound having an oxygen atom bonded directly to the tin atom. Such compounds include carboxylates and alcoholates of the formulae:

(a) $(Z)_2Sn\begin{smallmatrix}OZ^1\\|\\-OZ^2\end{smallmatrix}$ (b) $(Z)_2Sn(OOC-Z^3)_2$ (c) $Z^3-COO-\underset{|}{\underset{(Z)_2}{Sn}}-O-\underset{|}{\underset{(Z)_2}{Sn}}-OOC-Z^3$ (d) $(Z)_mSn(OOCCH=CHCOOZ^4)_{4-m}$ wherein Z and $Z^4$ independently are $C_1-C_{20}$ alkyl, cycloalkyl, aryl, alkaryl or aralkyl;

$Z^1$ is $C_{10}-C_{30}$ alkyl or phenyl substituted by one or two $C_8-C_{12}$ alkyl;

$Z^2$ is $Z^1$ or $-Sn(OZ^1)(Z)_2$;

$Z^3$ is $C_1-C_{30}$ alkyl, cycloalkyl, aryl, alkaryl or aralkyl; and m is an integer from 1 to 3.

When the Z substituents are alkyl, they may typically contain between 1 and 20 carbon atoms in a linear or branched chain including methyl, ethyl, n-propyl, isopropyl, n-butyl, isobutyl, sec-butyl, tert-butyl, n-amyl, neopentyl, isoamyl, n-hexyl, isohexyl, heptyl, octyl, decyl, dodecyl, tetradecyl and octadecyl. When they are cycloalkyl, they may typically be cyclopentyl, cyclohexyl, cycloheptyl, or cyclooctyl. When they are aralkyl, they may typically be benzyl, β-phenylethyl, γ-phenylpropyl or β-phenylpropyl. When they are aryl, they may typically be phenyl or naphthyl. When they are alkaryl, they may typically be tolyl, xylyl, p-ethylphenyl or p-nonylphenyl. This may also be be substituted in that they may bear substituents such as alkyl, aryl, cycloalkyl, aralkyl, alkaryl, ether, etc. Typical substituted aryl radicals include anisyl and biphenyl. Substituted aralkyl includes chlorobenzyl, p-phenylbenzyl and p-methylbenzyl. Substituted alkaryl includes 2,6-di-tert-butyl-4-methylphenyl.

Illustrative of these carboxylates are the following:
dibutyl-tin ditetradecyl oxide,
dibutyl-tin di-isotridecyl oxide,
dibutyl-tin-bis(p-octylphenyl oxide),
dioctyl-tin bis-(p-nonylphenyl oxide),
dioctyl-tin (ditetradecyl oxide),
bis(dibutyl-p-nonylphenyloxy-tin) oxide,
bis(dioctyl-p-octylphenyloxy-tin) oxide,
bis(dibutyl-isotridecyloxy-tin) oxide,
bis(dibutyl-tetradecyloxy-tin) oxide,
dibutyltin dilaurate,
bis(dibutyl-isodecanoyltin)oxide,
dibutyltin di-iosooctadecylate,
butyltin trioctanoate,
diphenyltin dilaurate,
dibutyltin bis(isooctylmaleate), dibutyltin dipelargonate,
dibutlytin distearate, dihexyltin dioleate, dioctyltin ditallate, dioctyltin diundecylenate, dibutyltin bis-(neodecanoate), dioctyltin bis-(neotridecanoate),
dibutyltin bis-(monomethyl maleate), dihexyltin bis-(monohexyl maleate), dihexyltin bis-(monoisooctyl maleate), dibutyltin bis-(monocetyl maleate), dibutyltin bis-(monooctadecyl maleate), dibutyltin bis-(mono-2-ethoxyethyl maleate), dioctyltin bis-(monocyclohexyl maleate), dihexyltin bis-(monobenzyl maleate) and
butylhexyltin bis(mono-tert.butylbenzyl maleate).

Additional tin stabilizers may be optionally blended with the above noted carboxylates to form the heat stabilizer component of the compositions of this invention, such blends being preferred for use in the instant invention. Such additional tin stabilizers include organotin mercaptoesters and/or organotin mercaptides. The organotin mercaptoesters correspond to the formula $(Z)_mSn(S-C_pH_{2p}COOZ^4)_{4-m}$ wherein Z, $Z^4$ and m are as previously defined, and p is an integer from 1 to 5. The aforementioned preferred members for these various substituents likewise apply in this instance.

Examples of such compounds are octyltin tris-(dodecyl-β-mercaptopropionate), dibutyltin bis(isotridecyl-β-mercaptopropionate), dibutyltin bis(2-ethylhexyl-β-mercaptopropionate), dibutyltin bis(tetradecyl-β-mercaptopropionate), octyltin tris(alfyl-thioglycolate), tributyltin isooctyl thioglycolate, butyltin tris(cyclohexyl thioglycolate), octyltin tris(isooctyl mercaptoacetate) and the like.

As previously noted, the organotin carboxylates and the organotin mercaptoesters and methods for their preparation are generally known. U.S. Pat. Nos. 2,870,182, 3,398,114, 3,562,305, 3,640,950, 3,640,947, 3,657,294, 3,933,741, 4,193,913, 4,358,555, Canadian Pat. Nos. 1,152,735 and 1,170,031 are typical of the numerous patents that disclose such organotin materials. Mixtures of carboxylates and mercaptoesters are particularly disclosed, for example, in U.S. Pat. Nos. 3,562,305, 3,933,741, Canadian Pat. Nos. 1,152,735 and 1,170,031. The disclosures in these patents are deemed to be fully encompassed herein.

As a further optional but preferred system, the organotin carboxylate by itself or in combination with the mercaptoester can be combined with an organotin mercaptide. The organotin mercaptides are also commerically available and well known to those skilled in the art. Such mercaptides correspond to the general formula $(Z^5S)_ySn(Z^6)_{4-y}$ wherein $Z^5$ and $Z^6$ are individually selected from alkyl, cycloalkyl, aryl, alkaryl or aralkyl radicals among others (specific substituents listed hereinabove) and y is 1–3. A wide variety of tin mercaptides and methods for preparation thereof are disclosed in U.S. Pat. Nos. 2,641,588, 2,726,227, 3,933,741 and 3,953,285. The disclosures in these patents relative to the tin mercaptides are deemed to be fully encompassed herein. Likewise, mixtures of carboxylates and mercaptides are disclosed, for example, in U.S. Pat. Nos. 3,562,305 and 3,933,741, with such disclosures being fully encompassed herein.

Representative mercaptides include dibutyltin bis(lauryl mercaptide), butyltin tris(lauryl mercaptide), dibutyltin bis(octyl mercaptide), dibutyltin bis(benzyl mercaptide), dioctyltin bis(cyclohexyl mercaptide), dioctyltin bis(octyl mercaptide), dimethyltin bis(lauryl mercaptide) and dicyclohexyltin bis(lauryl mercaptide).

With respect to concentrations of the components, the 2,2,6,6-tetraalkylpiperidine is present in amounts ranging from 0.1 to 3.0%, by weight of resin, and preferably 0.25 to 1.5%, and the organotin carboxylate is present in amounts ranging from 1.0 to 5.0%, by weight of resin, and preferably 1.5 to 4.0%. When the organotin mercaptoester and/or the tin mercaptide are present, they can replace either individually or together a maximum of about 70%, by weight, of the carboxylate and preferably up to about 40%, by weight.

The titanium dioxides that are conventionally utilized in rigid polyvinyl chloride formulations are known and commercially available. The preferred titanium dioxides are rutile grades. For purposes of this invention, a maximum of 10.0% of titanium dioxide, per weight of resin is applicable, with 4.0 to 6.0% being preferred when said titanium dioxide is present. These concentrations provide additional photodegradative inhibition when combined with the stabilization systems while substantially eliminating the aforementioned disadvantages of high titanium dioxide levels.

The instant invention relates to the stabilization of rigid polyvinyl chloride, i.e. unplasticized polyvinyl chloride resin, as well as materials containing at least 85% of polyvinyl chloride resin. Such resins generally contain additives including processing aids, impact modifiers, lubricants, pigments, fillers, and the like. It is also possible to combine the systems with conventional UV absorbers and antioxidants such as benzoates, benzotriazoles, benzophenones, hindered phenols or mixtures thereof. Techniques for processing rigid polyvinyl chloride are also known to those skilled in the art and such techniques are applicable herein. Compounding followed by extrusion is the conventional technique for siding manufacture.

As previously noted, the stabilized rigid polyvinyl chlorides of this invention exhibit a broad range of desirable properties. Of particular value they exhibit excellent thermal and UV stabilization over prolonged periods of time. They permit the reduction of titanium dioxide levels without sacrificing the light stability and impact strength provided by the high levels. In addition, the lowering or elimination of the titanium dioxide content allows for significantly reduced wear on the processing machinery and for an expansion of the number of pigmented systems that can be readily utilized therein. Thus, while the high titanium dioxide levels restrict the available colors to white and pastels, the instant systems are available in a broad range of light, pastel and dark colors.

The following examples illustrate the preferred embodiments of the invention. In these examples, all parts given are by weight unless otherwise specified.

EXAMPLE 1

The following rigid polyvinyl chloride formulations are utilized in the examples.

| | parts | | | | | | |
|---|---|---|---|---|---|---|---|
| | I | II | III | IV | V | VI | VII |
| polyvinyl chloride resin[1] | 100 | 100 | — | — | — | — | 100 |
| polyvinyl chloride resin[2] | — | — | 100 | 100 | 100 | 100 | — |
| methacrylic acid/ester processing aid[3] | 1.0 | 1.0 | 2.0 | 2.0 | 1.5 | 1.5 | 2.5 |
| acrylic impact modifier[4] | 7.0 | 7.0 | 7.0 | 7.0 | 7.0 | 7.0 | — |
| calcium stearate | — | — | 0.8 | — | 0.8 | — | — |
| paraffin wax | 0.6 | — | 1.0 | 1.0 | 1.0 | 1.0 | — |
| polyethylene wax | 0.3 | 0.2 | 0.2 | 0.2 | 2.0 | 0.2 | — |
| titanium dioxide (rutile, non-chalking | | | | variable | | | |
| light stabilizer | | | | variable | | | |
| heat stabilizer | | | | variable | | | |

[1]Diamond Shamrock 500
[2]GEON 103EP-76 from B.F. Goodrich Co.
[3]ACRYLOID K120N from Rohm & Haas
[4]ACRYLOID K323B from Rohm & Haas The ingredients are blended including the indicated amounts of TiO$_2$ and stabilizer. The samples are milled on a two roll mill (front roll @ 171° C.–back roll @ 165° C.) for a period of three minutes after band formation. The resulting material is then compression molded (temperature 182° C., 2 minutes contact pressure, 1 minute pumping pressure, 2 minutes full pressure, cool to 38° C.) and cut into test plaques (5.1 cm.×5.1 cm.)

The following compounds are utilized in these examples.

A-8-acetyl-3-dodecyl-7,7,9,9-tetramethyl-1,3,8-triazaspiro(4,5)decane-2,4-dione
B-bis(2,2,6,6-tetramethyl-4-piperidinyl)sebacate
C-bis(1-acetyl-2,2,6,6-tetramethyl-4-piperidinyl)sebacate
D-bis(1-benzyl-2,2,6,6-tetramethyl-4-piperidinyl)sebacate
E-poly[6-(1,1,3,3-tetramethylbutyl)amino-1,3,5-triazine-2,4-diyl-(2,2,6,6-tetramethyl-4-piperidinyl)iminohexamethylene-(2,2,6,6-tetramethyl-4-pipridinyl)imino]
F-N-butyl-(3,5-di-tert.butyl-4-hydroxybenzyl)-bis-(1,2,2,6,6-pentamethyl-4-piperidinyl)malonate
G-Dimethyl butanedioate polymer with 4-hydroxy-2,2,6,6-tetramethyl-1-piperidine ethanol

Heat Stabilizers

H-Tin mercaptide-THERMOLITE T137 from M & T Chemicals
I-Tin mercaptide-IRGASTAB T31M from Ciba-Geigy (Marienberg, Germany)
J-A blend of aproximately 2:1, by weight, mixed dibutyltin di-isotridecyl oxide/dibutyltin di-isostearate and dibutyltin bis(isotridecyl-$\beta$-mercaptopropionate)
K-A blend of approximately 2:1, by weight, of dibutyltin bis(mixed 2-ethylhexanoate and laurate) and dibutyltin bis(tetradecyl-$\beta$-mercaptopropionate)
L-A blend of 3:2, by weight, of dibutyltin bis(mixed 2-ethylhexanoate and tetradecanoate) and dibutyltin bis (isotridecyl-$\beta$-mercaptopropionate)

M-A blend of 2:1, by weight, of dibutyltin bis(mixed 2-ethylhexanoate and laurate) and dibutyltin bis (isotridecyl-$\beta$-mercaptopropionate)

N-A blend of 2:1, by weight, of mixed dibutyltin di-tetradecanoate/dibutyltin di-isotridecyl oxide and dibutyltin bis(isotridecyl-$\beta$-mercaptopropionate)

O-Tin carboxylate-IRGASTAB T9 from Ciba-Geigy (Marienberg, Germany)

Other Additives

P-2-(2'-hydroxy-3,5-diamylphenyl)benzotriazole

Q-1,6-hexanediol-bis-(3,5-di-tert.butyl-4-hydroxybenzoate)

The formulated samples are submitted to the following test procedures:

Test I-Dry Xenon Weatherometer Exposure

Exposed in Xenon Weatherometer at black panel temperature of 60°–66° C. and relative humidity of 25–35%. Samples are withdrawn at periodic intervals and yellowness index measured according to ASTM D-1925-63T. Higher values are indicative of lower stability. "Failure" reflects a yellowness index greater than 40.

Test II-Spray Xenon Weatherometer Exposure

Exposed as in Test I with identical black panel temperature, relative humidity of 65–75%, 102 minutes of dry cycle and 18 minutes of water spray cycle. Measured by yellowness index.

Test III-Arizona Exposure

Exposed outdoors in Arizona at an angle of 45° from the horizontal facing south. Yellowness index measured initially, after nine months exposure at 140,000 langleys and after twelve months exposure at 181,000 langleys.

The results obtained in these tests are noted in the following tables:

TABLE I

| | Test Procedure I | | | | |
|---|---|---|---|---|---|
| | Conc. | Conc. | \multicolumn{3}{c}{Yellowness Index} |
| Additives | Additives(phr) | TiO$_2$(phr) | 0 hrs. | 2045 hrs. | 4322 hrs. |
| Base Formulation I | | | | | |
| H | 1.6 | 12 | 8 | 16 | 20 |
| H | 1.6 | 5 | 7 | 26 | >40 |
| Base Formulation II | | | | | |
| J | 2.0 | 5 | 9 | 21 | 32 |
| A/J | 1/2 | 5 | 10 | 16 | 21 |
| B/J | 1/2 | 5 | 11 | 14 | 25 |
| C/J/P | 1/2/1 | 5 | 10 | 16 | 23 |
| D/J/P | 1/2/1 | 5 | 11 | 12 | 20 |

TABLE II

| | Test Procedure III | | | | |
|---|---|---|---|---|---|
| | Conc. | Conc. | \multicolumn{3}{c}{Yellowness Index} |
| Additives | Additives(phr) | TiO$_2$(phr) | 0 mos. | 9 mos. | 12 mos. |
| Base Formulation III | | | | | |
| H | 2 | 12 | 6 | 15 | 10 |
| H | 2 | 5 | 7 | 27 | 23 |
| Base Formulation IV | | | | | |
| J | 2 | 5 | 5 | 23 | 17 |

TABLE II-continued

| | Test Procedure III | | | | |
|---|---|---|---|---|---|
| | Conc. | Conc. | \multicolumn{3}{c}{Yellowness Index} |
| Additives | Additives(phr) | TiO$_2$(phr) | 0 mos. | 9 mos. | 12 mos. |
| B/J | 1/2 | 5 | 6 | 6 | 9 |

TABLE III

| | Test Procedure II | | | | |
|---|---|---|---|---|---|
| | Conc. | Conc. | \multicolumn{3}{c}{Yellowness Index} |
| Additives | Additives(phr) | TiO$_2$(phr) | 0 hrs. | 2500 hrs. | 3500 hrs. |
| Base Formulation V | | | | | |
| H | 2 | 12 | 5 | 7 | 8 |
| H | 2 | 5 | 4 | 8 | 15 |
| B/H | 1/2 | 5 | 5 | 8 | 18 |
| E/H | 0.3/2 | 5 | 6 | 7 | 12 |
| Base Formulation VI | | | | | |
| K | 2 | 5 | 4 | 5 | 8 |
| B/K | 1/2 | 5 | 4 | 5 | 8 |
| B/K/P | 1/2/1 | 5 | 3 | 3 | 6 |
| E/K | 0.3/2 | 5 | 5 | 3 | 5 |
| E/K/P | 0.3/2/1 | 5 | 4 | 5 | 7 |
| J | 2 | 5 | 4 | 8 | 12 |
| B/J | 1/2 | 5 | 3 | 2 | 4 |
| E/J | 0.3/2 | 5 | 3 | 4 | 8 |
| L | 2 | 5 | 4 | 8 | 16 |
| B/L | 1/2 | 5 | 4 | 5 | 11 |
| M | 2 | 5 | 3 | 8 | 13 |
| B/M | 1/2 | 5 | 3 | 3 | 6 |
| N | 2 | 5 | 3 | 7 | 12 |
| B/N | 1/2 | 5 | 3 | 2 | 6 |
| B/N/Q | 1/2/1 | 5 | 4 | 3 | 5 |

The following tests are directed to TiO$_2$-free systems.

TABLE IV

| | Test Procedure I | | | | | | |
|---|---|---|---|---|---|---|---|
| Additives Formulation VII | Conc. Additives(phr) | Conc. TiO$_2$ (phr) | 0 hrs | 400 hrs. | 700 hrs. | 1300 hrs. | 1900 hrs. |
| I | 2.5 | 0 | 8 | 12 | 53 | Fail | Fail |
| F/I | 0.5/2.5 | 0 | 8 | 20 | 40 | Fail | Fail |
| G/I | 0.5/2.5 | 0 | 8 | 16 | 41 | Fail | Fail |
| O | 2.5 | 0 | 16 | 5 | 5 | 17 | 25 |
| F/O | 0.5/2.5 | 0 | 16 | 12 | 11 | 12 | 9 |
| G/O | 0.5/2.5 | 0 | 16 | 4 | 4 | 7 | 7 |

These data clearly indicate that the rigid polyvinyl chloride formulations of this invention exhibit a broad range of performance improvements as well as perform to the level and frequently surpass the level of light stabilization of formulations containing the undesirable high levels of titanium oxide.

In summary, this invention provides novel stabilized rigid polyvinyl chloride compositions. Variations may be made in procedures proportions and materials without departing from the scope of the invention as defined by the following claims.

What is claimed is:

1. A rigid polyvinyl chloride composition comprising in addition to said polyvinyl chloride, (1) an effective stabilizing amount of a 2,2,6,6-tetraalkylpiperidine compound which corresponds to the formula

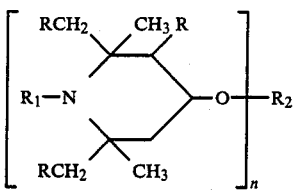

(II)

in which n is a number from 1-4 inclusive; R is hydrogen or methyl; $R_1$ is hydrogen, oxyl, $C_1$-$C_{13}$ alkyl, $C_3$-$C_8$ alkenyl, $C_3$-$C_8$ alkynyl, $C_7$-$C_{12}$ aralkyl, $C_1$-$C_8$ alkanoyl, $C_3$-$C_5$ alkenoyl, glycidyl, a group —$CH_2$CH(OH)—$Z_1$ wherein $Z_1$ is hydrogen, phenyl, $C_1$-$C_{12}$ alkyl, allyl, benzyl, acetyl or acryloyl; and $R_2$ when n is 1 is hydrogen, $C_1$-$C_{18}$ alkyl optionally interrupted by one or more oxygen atoms, cyanoethyl, benzyl, glycidyl, a monovalent radical of an aliphatic, cycloaliphatic, araliphatic or aromatic carboxylic acid, or of carbamic acid or of a phosphorus-containing acid, or a monovalent silyl radical, $R_2$ when n is 2 is $C_1$-$C_{12}$ alkylene, $C_4$-$C_{12}$ alkenylene, xylylene, a bivalent radical of an aliphatic, cycloaliphatic, araliphatic or aromatic dicarboxylic acid, of dicarbamic acid or of a phosphorus-containing acid, or a bivalent silyl radical; $R_2$ when n is 3 is a trivalent radical of an aliphatic, cycloaliphatic or aromatic tricarboxylic acid, of an aromatic tricarbamic acid or of a phosphorus-containing acid, or a trivalent silyl radical; and $R_2$ when n is 4 is a tetravalent radical of an aliphatic, cycloaliphatic or aromatic tetracarboxylic acid; and (2) an effective thermal stabilizing amount of at least one organotin carboxylate of the formulae (a) 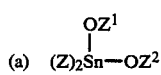

(b) $(z)_2Sn(OOC—Z^3)_2$ (c) 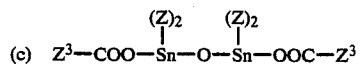

(d) $(Z)_mSn(OOCCH=CHCOOZ^4)_{4-m}$
wherein
Z and $Z^4$ independently are $C_1$-$C_{20}$ alkyl, cycloalkyl, aryl, alkaryl or aralkyl;
$Z^1$ is $C_{10}$-$C_{30}$ alkyl or phenyl substituted by one or two $C_8$-$C_{12}$ alkyl;
$Z^2$ is $Z^1$ or —$Sn(OZ^1)(Z)_2$;
$Z^3$ is $C_1$-$C_{30}$ alkyl, cycloalkyl, aryl, alkaryl or aralkyl; and
m is an integer from 1 to 3.

2. The compositions of claim 1, wherein said 2,2,6,6-tetraalkylpiperidine compound is bis(2,2,6,6-tetramethyl-4-piperidinyl)sebacate, bis(1-acetyl-2,2,6,6-tetramethyl-4-piperidinyl)sebacate, bis(1-benzyl-2,2,6,6-tetramethyl-4-piperidinyl)sebacate or N-butyl-(3,5-di-tert.butyl-4-hydroxybenzyl)-bis-(1,2,2,6,6-pentamethyl-4-piperidinyl)malonate.

3. The composition of claim 1, wherein said piperidine compound is present in a concentration of from 0.1 to 3.0% and said carboxylate is present in a concentration of from 1.0 to 5.0%, each by weight of polyvinyl chloride resin.

4. The composition of claim 3, wherein said concentrations are 0.25 to 1.5% and 1.5 to 4.0% respectively, by weight of polyvinyl chloride resin.

5. The composition of claim 1, wherein said carboxylate component is a blend of formulae (a) and (b).

6. The composition of claim 1, wherein said carboxylate is dibutyltin di-isotridecyloxide, dibutyltin di-isostearate, dibutyltin di-2-ethylhexanoate, dibutyltin dilaurate, dibutyltin ditetradecanoate or mixtures thereof.

7. The composition of claim 2, wherein said carboxylate is dibutyltin di-isotridecyloxide, dibutyltin di-isostearate, dibutyltin di-2-ethylhexanoate, dibutyltin dilaurate, dibutyltin di-tetradecanoate or mixtures thereof.

8. The composition of claim 1, which contains an additional organotin compound of the formulae
(e) $(Z)_mSn(S—C_pH_{2p}COOZ^4)_{4-m}$
(f) $(Z^5S)_ySn(Z^6)_{4-y}$
wherein
Z, $Z^4$, $Z^5$ and $Z^6$ independently are $C_1$-$C_{20}$ alkyl, cycloalkyl, aryl, alkaryl or aralkyl,
m and y are integers from 1-3, and
p is an integer from 1-5;
said additional organotin compound replacing up to a maximum of about 70%, by weight, of said organotin carboxylate.

9. The composition of claim 8, wherein said additional organotin compound is formula (e) and p is 2.

10. The composition of claim 9, wherein said compound of formula (e) is dibutyltin bis(isotridecyl-β-mercaptopropionate), dibutyltin bis(tetradecyl-β-mercaptopropionate), octyltin tris(dodecyl-β-mercaptopropionate) or dibutyltin bis(2-ethylhexyl-β-mercaptopropionate).

11. The composition of claim 8, wherein said piperidine compound is bis(2,2,6,6-tetramethyl-4-piperidinyl)-sebacate, bis(1-acetyl-2,2,6,6-tetramethyl-4-piperidinyl)sebacate, bis(1-benzyl-2,2,6,6-tetramethyl-4-piperidinyl)sebacate or N-butyl-(3,5-di-tert.butyl-4-hydroxybenzyl)-bis-(1,2,2,6,6-pentamethyl-4-piperidinyl)malonate; said carboxylate is dibutyltin di-isotridecyloxide, dibutyltin di-isostearate, dibutyltin di-2-ethyl-hexanoate dibutyltin dilaurate, dibutyltin ditetradecanoate or mixtures thereof; and said additional organotin compound is dibutyltin bis(isotridecyl-β-mercaptopropionate), dibutyltin bis(tetradecyl-β-mercaptopropionate), octyltin tris(dodecyl-β-mercaptopropionate) or dibutyltin bis(2-ethylhexyl-β-mercaptopropionate).

12. The composition of claim 1 which also contains a maximum of 10% titanium dioxide, by weight of polyvinyl chloride resin.

13. The composition of claim 8 which also contains a maximum of 10% titanium dioxide, by weight of polyvinyl chloride resin.

14. The composition of claim 1 which also contains benzoates, benzotriazoles, benzophenones, hindered phenols or mixtures thereof.

15. The composition of claim 8 which also contains benzoates, benzotriazoles, benzophenones, hindered phenols or mixtures thereof.

16. The composition of claim 11 which also contains benzoates, benzotriazoles, benzophenones, hindered phenols or mixtures thereof.

* * * * *